US010922514B2

(12) United States Patent
Uchida

(10) Patent No.: US 10,922,514 B2
(45) Date of Patent: Feb. 16, 2021

(54) ELECTRONIC APPARATUS

(71) Applicant: KYOCERA Document Solutions Inc., Osaka (JP)

(72) Inventor: Yuzuru Uchida, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 16/475,232

(22) PCT Filed: Dec. 7, 2017

(86) PCT No.: PCT/JP2017/044032
§ 371 (c)(1),
(2) Date: Jul. 1, 2019

(87) PCT Pub. No.: WO2018/128047
PCT Pub. Date: Jul. 12, 2018

(65) Prior Publication Data
US 2019/0340410 A1  Nov. 7, 2019

(30) Foreign Application Priority Data
Jan. 6, 2017  (JP) .............................. JP2017-001418

(51) Int. Cl.
*G06K 9/00* (2006.01)
*G06F 21/32* (2013.01)

(52) U.S. Cl.
CPC ......... *G06K 9/00013* (2013.01); *G06F 21/32* (2013.01); *G06K 9/00067* (2013.01)

(58) Field of Classification Search
CPC ..... G06F 21/32; G06F 21/31; G06K 9/00087; G06K 9/00013; G06K 9/00892; G06K 9/00006; G06Q 20/40145; G06Q 20/40; G06Q 20/4012
USPC .................... 382/124, 115; 705/44; 340/5.51
See application file for complete search history.

(56) References Cited

U.S. PATENT DOCUMENTS

| | | | |
|---|---|---|---|
| 2014/0347161 A1* | 11/2014 | Sheu | G07C 9/33 340/5.53 |
| 2015/0128252 A1 | 5/2015 | Konami | |
| 2020/0128124 A1* | 4/2020 | Lin | G06K 9/00288 |

FOREIGN PATENT DOCUMENTS

JP          2009-199235          9/2009

* cited by examiner

*Primary Examiner* — Koosha Sharifi-Tafreshi

(57) ABSTRACT

An authentication method selecting unit 31 automatically selects one user authentication method among predetermined plural user authentication methods on the basis of an output from at least one among an imaging device 17 built in this electronic apparatus, an acceleration sensor 15 built in this electronic apparatus and a position detecting device 14 built in this electronic apparatus. Further, a user authenticating unit 32 performs user authentication in accordance with the user authentication method selected by the authentication method selecting unit 31.

4 Claims, 2 Drawing Sheets

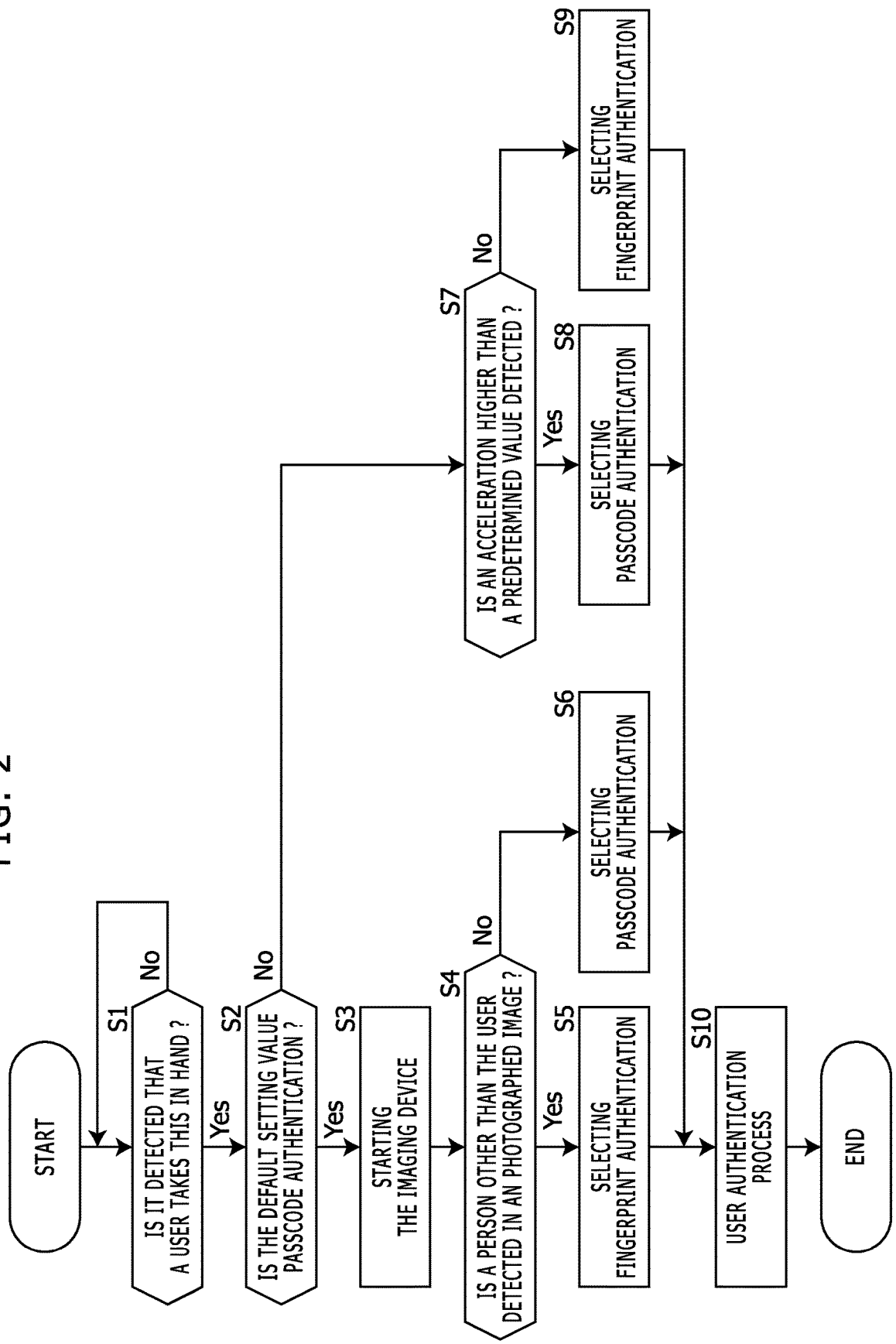

ELECTRONIC APPARATUS

TECHNICAL FIELD

The present invention relates to an electronic apparatus.

BACKGROUND ART

An image processing apparatus displays an authentication method list that includes a user authentication method based on character input and a user authentication method based on finger print scanning, and performs user authentication in accordance with an authentication method selected by a user in the authentication method list. (see PATENT LITERATURE #1).

CITATION LIST

Patent Literature

PATENT LITERATURE #1: Japanese Patent Application Publication No. 2009-199235.

SUMMARY OF INVENTION

Technical Problem

However, in the aforementioned image processing apparatus, a user is required to perform an operation to select a desired authentication method from the authentication method list, and therefore, the user is required to perform a complicated user operation for user authentication.

In addition, in case of only one authentication method, an operation to select a desired authentication method is unnecessary, but a user may not perform user authentication with a desired user authentication method.

The present invention is conceived in view of the aforementioned problem and aims for providing an electronic apparatus that performs user authentication in accordance with a user authentication method suitable to a situation that a user is in, even though the user does not select a desired user authentication method.

Solution to Problem

An electronic apparatus according to the present invention includes an authentication method selecting unit that automatically selects one user authentication method among predetermined plural user authentication methods on the basis of an output from at least one among an imaging device built in this electronic apparatus, an acceleration sensor built in this electronic apparatus and a position detecting device built in this electronic apparatus; and a user authenticating unit that performs user authentication in accordance with the user authentication method selected by the authentication method selecting unit.

Advantageous Effect of Invention

By means of the present invention, user authentication is performed in accordance with a user authentication method suitable to a situation that a user is in, even though the user does not select a desired user authentication method.

These and other objects, features and advantages of the present invention will become more apparent upon reading of the following detailed description along with the accompanied drawings.

BRIEF DESCRIPTION OF DRAWINGS

FIG. 2 shows a flowchart that explains a behavior of the electronic apparatus shown in FIG. 1.

DESCRIPTION OF EMBODIMENTS

Figure 1:
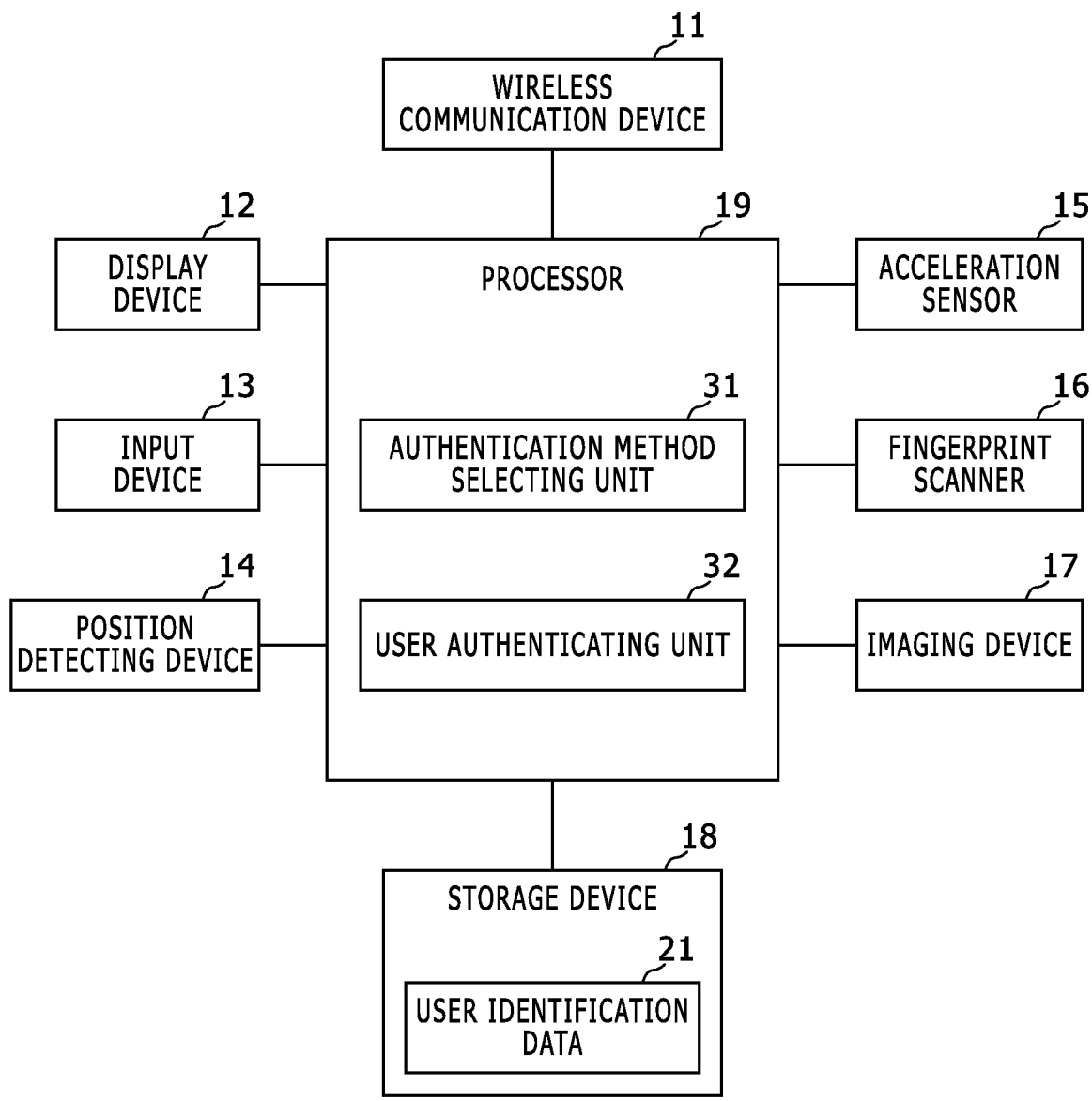
FIG. 1 shows a block diagram that indicates a configuration of an electronic apparatus according to an embodiment of the present invention.

Hereinafter, an embodiment according to aspects of the present invention will be explained with reference to drawings.

FIG. 1 shows a block diagram that indicates a configuration of an electronic apparatus according to an embodiment of the present invention. The electronic apparatus shown in FIG. 1 is a mobile terminal device such as smartphone, for example.

The electronic apparatus shown in FIG. 1 includes a wireless communication device 11, a display device 12, an input device 13, a position detecting device 14, an acceleration sensor 15, a fingerprint scanner 16, an imaging device 17, a storage device 18, and a processor 19.

The wireless communication device 11 is, for example, a communication circuit capable to connecting to a wireless telephone network, a wireless LAN interface or the like, and performs wireless communication in accordance with a predetermined wireless communication standard.

The display device 12 is a device such as a liquid crystal display arranged on a housing of this electronic apparatus and displays sorts of screens to a user.

The input device 13 is a device such as a touch panel arranged on the display device 12, a hard key or the like, and detects a user operation.

The position detecting device 14 determines a position of this electronic apparatus, for example, using GPS (Global Positioning System).

The acceleration sensor 15 detects an acceleration of this electronic apparatus.

The fingerprint scanner 16 optically scans a fingerprint image and outputs it.

The imaging device 17 photographs a field of view within a predetermined range and outputs a photographed image.

The storage device 18 is a nonvolatile storage device such as flash memory and stores user identification data 21.

The user identification data 21 includes identification information (an authentic passcode for a passcode authentication, a characteristic value of an authentic fingerprint for a fingerprint authentication and the like) unique to a registered user (e.g. an owner of the electronic apparatus 1), and the identification information is required in predetermined plural user authentication methods.

The processor 19 is a computer that includes a CPU (Central Processing Unit), a ROM (Read Only Memory), a RAM (Random Access Memory) and the like, and loads a program to the RAM from the storage device 18 or the ROM and executes the program using the CPU and thereby acts as sorts of processing units.

In this embodiment, the processor 19 acts as an authentication method selecting unit 31 and a user authenticating unit 32.

The authentication method selecting unit 31 automatically selects one user authentication method among predetermined plural user authentication methods (here, a passcode authentication and a fingerprint authentication) on the basis of an output from at least one among an imaging device 17 built in this electronic apparatus, an acceleration sensor 15 built in this electronic apparatus and a position detecting device 14 built in this electronic apparatus.

The user authenticating unit 32 performs user authentication using the user authentication data 21 in accordance with the user authentication method selected by the authentication method selecting unit 31.

Further, in this embodiment, if a default user authentication method is a passcode authentication, then the authentication method selecting unit 31 (a) determines whether a person other than a user is detected in a photographed image obtained from the imaging device 17 or not, and (b1) selects a fingerprint authentication if a person other than a user is detected in the photographed image and (b2) selects the passcode authentication if a person other than a user is not detected in the photographed image. A setting value of the default user authentication method is included in the user identification data 21, and the authentication method selecting unit 31 refers to the user identification data 21 and thereby determines the default user authentication method.

Consequently, it is restrained that a person other than a registered user steals a glance at a passcode inputted for the passcode authentication.

For example, the authentication method selecting unit 31 performs a face recognition process on the photographed image, and if a face other than a face of the pre-registered user is detected in the photographed image, determines that a person other than the registered user is detected. Further, the authentication method selecting unit 31 may perform a face recognition process on the photographed image, and if faces of two or more persons are detected in the photographed image, may determine that a person other than the registered user is detected.

Furthermore, in this embodiment, if a default user authentication method is a fingerprint authentication, then the authentication method selecting unit 31 (a) determines whether an acceleration that exceeds a predetermined value is detected by the acceleration sensor 15 or not, and (b1) selects a passcode authentication if an acceleration that exceeds the predetermined value is detected and (b2) selects the fingerprint authentication if an acceleration that exceeds the predetermined value is not detected.

Consequently, while a user is running in a hurry, for example, the passcode authentication is selected that the input can be done in a shorter time than the fingerprint authentication.

The following part explains the aforementioned electronic apparatus. FIG. 2 shows a flowchart that explains a behavior of the electronic apparatus shown in FIG. 1.

When a user is in a logout status, the authentication method selecting unit 31 watches whether a user takes this electronic apparatus in hand or not (in Step S1). For example, using the acceleration sensor 15, a gyro sensor (not shown) and/or the like, the authentication method selecting unit 31 detect that a user takes this electronic apparatus in hand.

When detecting that a user takes this electronic apparatus in hand, the authentication method selecting unit 31 determines whether a setting value of a default user authentication method indicates a passcode authentication or not (in Step S2).

If the setting value of the default user authentication method indicates a passcode authentication, then the authentication method selecting unit 31 starts the imaging device 17 and obtains a photographed image from the imaging device 17 (in Step S3). Subsequently, the authentication method selecting unit 31 determines whether a person other than the registered user is detected in the photographed image obtained from the imaging device 17 or not (in Step S4).

If a person other than the registered user is detected in the photographed image, then the authentication method selecting unit 31 selects a fingerprint authentication (in Step S5). Contrarily, if a person other than the registered user is not detected in the photographed image, then the authentication method selecting unit 31 selects the passcode authentication (in Step S6).

Meanwhile, if the setting value of the default user authentication method indicates the fingerprint authentication (in Step S2), then the authentication method selecting unit 31 obtains a current acceleration using the acceleration sensor 15, and determines whether an acceleration that exceeds a predetermined value is detected or not (in Step S7).

If an acceleration that exceeds the predetermined value is detected, then the authentication method selecting unit 31 selects the passcode authentication (in Step S8). Contrarily, if an acceleration that exceeds the predetermined value is not detected, then the authentication method selecting unit 31 selects the fingerprint authentication (in Step S9).

The authentication method selecting unit 31 selects the user authentication method as mentioned, and subsequently, the user authenticating unit 32 performs user authentication in accordance with the selected user authentication method (in Step S10).

For example, in the passcode authentication, the user authenticating unit 32 displays a screen for input of a passcode on the display device 12, detects a passcode inputted to the screen by a user using the input device 13, determines whether the detected passcode agrees with a passcode registered in the user identification data 21 or not, and if the both agree with each other, determines that the user authentication is succeeded and if the both do not agree with each other, determines that the user authentication is failed.

For example, in the fingerprint authentication, the user authenticating unit 32 displays on the display device 12 a screen that prompts the user to put a user's finger on the fingerprint scanner 16, obtains a fingerprint image scanned by the fingerprint scanner 16, extracts a characteristic value of the user's fingerprint from the fingerprint image, determines whether this characteristic value agrees with a characteristic value registered in the user identification data 21 or not, and if the both agree with each other, determines that the user authentication is succeeded and if the both do not agree with each other, determines that the user authentication is failed.

Subsequently, if the user authentication is succeeded, then the user authenticating unit 32 allows logging-in, and for example, displays an operation screen on the display device 12, and thereby makes this electronic apparatus available. Contrarily, if the user authentication is failed, then the user authenticating unit 32 denies logging-in.

As mentioned, in the aforementioned embodiment, the authentication method selecting unit 31 automatically selects one user authentication method among predetermined plural user authentication methods on the basis of an output from at least one among the imaging device 17 built in this electronic apparatus, the acceleration sensor 15 built in this electronic apparatus and the position detecting device built in this electronic apparatus. Further, the user authenticating unit 32 performs user authentication in accordance with the user authentication method selected by the authentication method selecting unit 31.

Consequently, the user authentication is performed in accordance with a user authentication method suitable to a situation that a user is in, even though the user does not select a desired user authentication method.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, if the default user authentication method is a passcode authentication, then the authentication method selecting unit 31 may (a) determine whether a current position detected by the position detecting unit 14 is in a predetermined home area or not, and (b1) select a fingerprint authentication if the current position is not in the home area and (b2) select the passcode authentication or the pattern input authentication if the current position is in the home area. In such a case, the home area is set as the registered user's home or the like, for example, and position information of the home area is included into the user identification data 21 in advance.

Further, in the aforementioned embodiment, if the default user authentication method is a passcode authentication, then the authentication method selecting unit 31 may (a1) determine whether a person other than the user is detected in a photographed image obtained from the imaging device 17 or not and (a2) determine whether a current position detected by the position detecting unit is in a predetermined home area or not, and (b1) if a person other than the user is detected in the photographed image, select a fingerprint authentication if the current position is not in the home area and select the passcode authentication if the current position is in the home area and (b2) if a person other than the user is not detected in the photographed image, select the passcode authentication regardless of the current position.

Further in the aforementioned embodiment, the predetermined plural user authentication methods may include a user authentication method other than the passcode authentication and the fingerprint authentication (such as pattern input authentication, IC card authentication and the like). The pattern input authentication may be used instead of the aforementioned passcode authentication.

INDUSTRIAL APPLICABILITY

For example, the present invention is applicable to a mobile terminal device.

The invention claimed is:

1. An electronic apparatus, comprising:
an authentication method selecting unit that automatically selects one user authentication method among predetermined plural user authentication methods on the basis of an output from at least one among an imaging device built in this electronic apparatus, an acceleration sensor built in this electronic apparatus and a position detecting device built in this electronic apparatus; and
a user authenticating unit that performs user authentication in accordance with the user authentication method selected by the authentication method selecting unit,
wherein if a default user authentication method is a passcode authentication or a pattern input authentication, then the authentication method selecting unit (a) determines whether a person other than a user is detected in a photographed image obtained from the imaging device or not, and (b1) selects a fingerprint authentication if a person other than a user is detected in the photographed image and (b2) selects the passcode authentication or the pattern input authentication if a person other than a user is not detected in the photographed image.

2. An electronic apparatus, comprising:
an authentication method selecting unit that automatically selects one user authentication method among predetermined plural user authentication methods on the basis of an output from at least one among an imaging device built in this electronic apparatus, an acceleration sensor built in this electronic apparatus and a position detecting device built in this electronic apparatus; and
a user authenticating unit that performs user authentication in accordance with the user authentication method selected by the authentication method selecting unit,
wherein if a default user authentication method is a fingerprint authentication, then the authentication method selecting unit (a) determines whether an acceleration that exceeds a predetermined value is detected by the acceleration sensor or not, and (b1) selects a passcode authentication or a pattern input authentication if an acceleration that exceeds the predetermined value is detected and (b2) selects the fingerprint authentication if an acceleration that exceeds the predetermined value is not detected.

3. An electronic apparatus, comprising:
an authentication method selecting unit that automatically selects one user authentication method among predetermined plural user authentication methods on the basis of an output from at least one among an imaging device built in this electronic apparatus, an acceleration sensor built in this electronic apparatus and a position detecting device built in this electronic apparatus; and
a user authenticating unit that performs user authentication in accordance with the user authentication method selected by the authentication method selecting unit,
wherein if a default user authentication method is a passcode authentication or a pattern input authentication, then the authentication method selecting unit (a) determines whether a current position detected by the position detecting unit is in a predetermined home area or not, and (b1) selects a fingerprint authentication if the current position is not in the home area and (b2) selects the passcode authentication or the pattern input authentication if the current position is in the home area.

4. The electronic apparatus according to claim 2, wherein if a default user authentication method is a passcode authentication or a pattern input authentication, then the authentication method selecting unit (a1) determines whether a person other than a user is detected in a photographed image obtained from the imaging device or not and (a2) determines whether a current position detected by the position detecting unit is in a predetermined home area or not, and (b1) if a person other than a user is detected in the photographed image, selects a fingerprint authentication if the current position is not in the home area and selects the passcode authentication or the pattern input authentication if the current position is in the home area and (b2) if a person other than a user is not detected in the photographed image, selects the passcode authentication or the pattern input authentication regardless of the current position.

* * * * *